April 11, 1961 HANS-ROBERT KÜHN 2,979,573

TRANSDUCER DEVICES FOR STEREOPHONIC GROOVED SOUND RECORDS

Filed Oct. 29, 1958 2 Sheets-Sheet 1

April 11, 1961 HANS-ROBERT KÜHN 2,979,573

TRANSDUCER DEVICES FOR STEREOPHONIC GROOVED SOUND RECORDS

Filed Oct. 29, 1958 2 Sheets-Sheet 2

United States Patent Office 2,979,573

Patented Apr. 11, 1961

2,979,573

TRANSDUCER DEVICES FOR STEREOPHONIC GROOVED SOUND RECORDS

Hans-Robert Kühn, Kiel-Gaarden, Germany, assignor to Electroacustic Gesellschaft mit beschränkter Haftung, Kiel, Germany, a corporation of Germany Filed Oct. 29, 1958, Ser. No. 770,412

Claims priority, application Germany Nov. 13, 1957

21 Claims. (Cl. 179—100.41)

My invention relates to electrostrictive devices for the simultaneous recording or reproducing of stereophonic grooved sound tracks by means of a single stylus, and more particularly to single-stylus devices for simultaneously producing or reproducing two parallel sound tracks whose respective undulatory amplitudes extend along a single groove but in two planes substantially perpendicular to each other. In one type of such stereophonic records, one of the two sound tracks extends along the groove bottom and has hill-and-dale undulations in a vertical plane, while the other sound track extends along a lateral side of the groove so that its plane of undulations is horizontal, the surface of the record disc being assumed to be horizontal. In another type of stereophonic discs, both tracks are lateral and extend along the two sidewalls of the groove, the respective walls or planes of undulations being inclined about 45° to the disc surface.

The known electrostrictive devices for such stereophonic purposes have two separate and individually mounted transducers, such as Rochelle-salt crystals or piezoelectric ceramic members of barium titanate, which are fastened and operated independently of each other except for their mechanical connection to a single stylus. Each transducer has one end clamped to the housing structure of the pickup. The respective other, free ends of both transducers are linked to the stylus by coupling means which must satisfy rather difficult requirements because the stylus must be kept in positive engagement with both transducers free of any clearance, yet neither transducer must be appreciably pre-tensioned thereby.

It is an object of my invention to devise an electrostrictive device for stereophonic phonograph purposes that affords giving the transducer assembly a smaller mass and smaller space requirements compared with the known devices. Another object, akin to those mentioned, is to reduce the weight and pressure imposed by the stylus upon the record groove, particularly for sound-reproducing purposes. A further object is to secure an extremely slight vertical mass inertia of the pickup system so as to permit, for example, a scanning of the grooved sound tracks with stylus pressures as low as one to two grams.

Still another object of my invention is to simplify and improve the linkage between the stylus and the two transducers so that the linking means do not involve more expenditure or difficulty than with monophonic pickups while nevertheless securing the desired good channel separation.

It is also an object to devise a phonograph pickup which is suitable for use with vertical-horizontal types of stereo recordings as well as for those of the 45° type.

According to my invention, I provide two electrostrictive transducer elements of which only one is fastened to the housing or supporting structure of the stylus device, whereas the other is fastened to the first-mentioned transducer in generally axial alignment therewith and is coupled with the stylus. The two transducers, thus mechanically joined in series, have respectively different directions of maximum sensitivity, hereinafter called "main orientations," in accordance with the respective direction of the two planes of track undulations. The transducer members may consist of Rochelle salt or other piezoelectric substance such as a ceramic barium-titanate member.

In such a device the respective transducer elements are coordinated to the two sound tracks so that, in a phonograph pickup of this type, each transducer responds virtually only to the one correlated track and translates its undulations into electric pulses. The transducer elements are either of the bender type or of the twister type, or both types of transducers may be used in one and the same device.

As in the known stereophonic pickups, the two transducer elements form part of respectively different electric channels. Although in such a device, referring to its use as a reproducing pickup, the two transducer elements are always stressed simultaneously regardless of the particular direction in which the stylus point may be deflected at a time, I have found that nevertheless the two transducer elements, by virtue of their proper difference in main orientation, respond individually to the one coordinated sound track, and that any "noise effect" of a transducer element not stressed in the proper orientation at a time, as well as any cross-talk between the two channels, remains within satisfactory limits.

According to one of the more specific features of my invention, the transducer elements consist of piezoelectric plates or strips and are so joined with each other as to extend substantially in a single plane. In this case it is preferable to use a transducer plate of the bender type together with a transducer of the twister type.

According to another and particularly advantageous embodiment of the invention, the transducers consist of piezoelectric plates or strips and are so connected with each other that the area of largest dimension of one transducer element is substantially perpendicular to the corresponding area of the other element.

According to a further feature of my invention, the individual transducer elements are subjected to respectively different amounts of damping for the purpose of linearizing the frequency characteristic of the respective transducers. For example, one of the transducer elements may be held only in elastic bearing means, whereas the other is additionally embedded in a damping substance, for example, silicone paste. An optimum degree of channel separation is obtained if each of the two planes of largest dimensions of the respective transducer elements extends at a right angle to the plane of undulations of the one correlated sound track.

According to another feature of my invention, the two mechanically series-connected transducer elements have a common longitudinal axis and are each provided on both broad-area surfaces with respective pairs of metal electrode foils, the two electrodes of each pair on the same surface being spaced from each other along the longitudinal or transverse symmetry axis of that surface. Each two electrodes located opposite each other on the two sides of each transducer are electrically connected in series with the two other electrodes of the same transducer or with two opposite electrodes of the other transducer, depending upon whether the pickup is to be used for vertical-horizontal stereo tracks or for 45° tracks as will be more fully set forth hereinafter.

The foregoing and other objects, advantages and features of my invention will be apparent from the embodiments of devices according to the invention illustrated by way of example on the accompanying drawings and described below. In the drawings.

Figure 1:
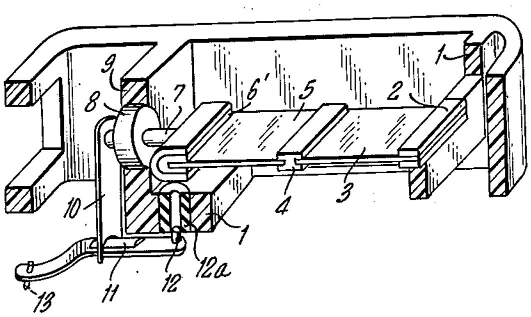
Fig. 1 shows a perspective and partly sectional view of a first embodiment.

The stereophonic phonograph pickup according to Fig. 1 has a housing structure 1 of rigid material such as polystyrol, to whose rear portion a piezoelectric plate 3 is attached by means of interposed elastic clamping strips 2 of rubber. The opposite edge of plate 3 engages a groove of a connecting piece 4, preferably of a synthetic plastic material, which may either be rigid or may have some inherent elasticity. Another groove of piece 4 engages one edge of a second transducer plate 5. Both transducer elements 3 and 5 may consist of Rochelle salt, and both may have substantially the same thickness. Each element may further be composed of two crystal plates cemented together in face-to-face contact. The areas of largest dimensions of the two plates are substantially in a single plane which in this case is parallel to the horizontal surface plane of the record disc (not shown). The transducer 3 is a bender. The transducer 5 is a twister. That is, they differ from each other in that the transducer plates are cut from the original, larger crystal under respectively different angles relative to the crystal main axis. A bender is obtained by the so-called "45° cut," and a twister by the so-called "90° cut," as is well known in the art. It will be understood that, by virtue of the just-mentioned difference, the main orientations of the two transducer members, that is, their respective directions of maximum sensitivity, are different.

The transducer 5 has its other transverse edge held in an elastic holder 6 which may consist of a rigid part of U-shaped cross-section, preferably of plastic material, and an insert 6' of rubber as illustrated. A pivot pin 7 of holder 6 passes through an elastic bushing or grommet 8 of rubber mounted in a wall 9 of the housing 1. Pivot pin 7 and the bushing 8 form together an elastic bearing. The pivot pin 7 can be turned in bushing 8 about the axis of the pin. However, due to the inherent elasticity of bushing 8, pin 7 can also be deflected radially. The pivot axis of pin 7 coincides with the torsion axis of the twister 5. The portion of pivot pin 7 protruding out of the bushing 8 is firmly connected with linking lever 10 which connects it with a stylus arm 11. Link 10 extends from pivot pin 7 downwardly to beneath the lower edge of the pickup housing 1. The lower end of link 10 is bifurcated and straddles the pickup arm 11. Arm 11 has a pivot boss 12 seated in an elastic grommet **12*a* secured to the housing 1. Boss 12 and grommet 12*a* form together a universal pivot which permits the stylus arm 11 to deflect about this pivot in a vertical direction as well as horizontally. A stylus 13, such as a diamond or sapphire, is rigidly mounted on the free end of arm 11** remote from the universal pivot.

When using the pickup with stereophonic grooved record discs in which one sound track extends along the groove bottom and the other along one side wall of the groove, the stylus 13, during operation, is deflected in the vertical as well as in the horizontal direction due to its engagement with the respective two sound tracks. In the event of a purely horizontal deflection the arm 11, acting through link 10 and pin 7 upon both transducer elements, causes essentially only a twisting of the transducer elements 3 and 5. However, only the twister 5 is capable of responding to such torsional stress, whereas the bender 3 remains substantially unaffected, that is, it may produce not more than a slight noise voltage which, however, remains within satisfactory limits.

When the stylus 13 is deflected purely vertically, link 10 causes the pivot pin 7 to move upwardly or downwardly in the elastic bushing 8 under deformation of the bushing. As a result, both transducer plates are subjected to bending, but only the transducer 3, designed as a bender, furnishes utilizable voltage. Actually, the stylus will perform various deflective movements that have horizontal and vertical components, and these components are then properly distributed to the two transducers.

In order to make the frequency response of each transducer element as closely linear as may be desirable, it is preferable to subject them to respectively different amounts of damping. For this purpose the two holding or damping members 2 and 6 can be given respectively different degrees of elasticity.

Figure 2:
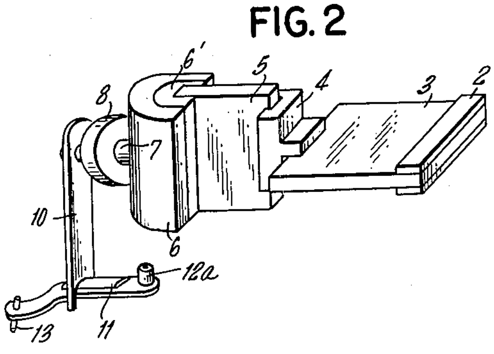

In the pickup according to Fig. 2, the transducer 3 is a bender and is clamped at one transversal edge in the housing of the pickup by means of elastic clamping strips 2 in the same manner as described above with reference to Fig. 1. The opposite transverse edge of the transducer 3 is fastened in a groove of a cross-shaped connecting piece 4 which forms a constrained force-transmitting connection with a twister-type transducer 5. The plane of transducer 3, that is, its areas of greatest dimensions, is horizontal and thus parallel to the surface plane of the phonograph disc. The corresponding plane of transducer 5 extends at a right angle to that of transducer 3. Consequently, the area of greatest dimensions of transducer 5 is perpendicular to the surface plane of the record disc. The coupling of transducer 5 with the stylus arm 11 through an elastic member 6, a pivot pin 7, an elastic bushing 8, and a link 10 engaging the stylus arm 11, is identical with the one described above with reference to Fig. 1.

The performance of the pickup corresponds essentially to that of the one shown in Fig. 1. However, by virtue of the vertical arrangement of the twister 5, the vertical deflection of the stylus 13 has only the effect of subjecting the bender 3 to deformation. The undesirable "noise-effect" of the twister 5, which serves to translate only the lateral deflections of the stylus into electric pulses, is thus reduced virtually to zero.

Figure 3:
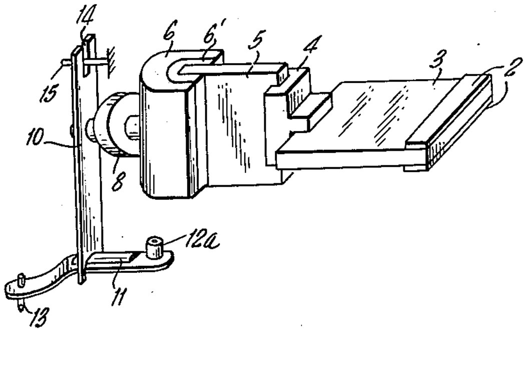

The pickup illustrated in Fig. 3 is a modification of the one shown in Fig. 2 and differs only in that the transducer 5 is a bender and that the link 10 extends upwardly beyond the pivot pin 7. The upper end of link 10 has a vertical slot engaged by a guide pin 15 which is firmly connected with the supporting structure or housing (not shown in Fig. 3) of the pickup. The bearing thus provided at the upper end of link 10 permits vertical displacement of link 10 and pivot pin 7 and simultaneously a rotating motion of the link about the pin 15. As a result, the pivot pin 7 cannot perform any rotational motion about its own axis when the stylus is deflected vertically and horizontally. Hence, the pivot pin 7 is displaced substantially only in lateral and vertical directions within the elastic bushing 8. Lateral deflection of pivot pin 7 causes bending of transducer 5, and vertical deflection of pivot pin 7 causes bending of transducer 3.

Figure 4:
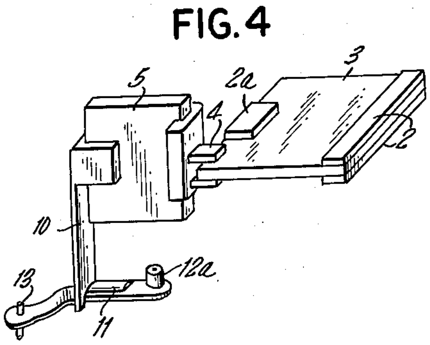
Figs. 2, 3, 4 illustrate schematically and in perspective three further embodiments, the housing structure of the device being omitted.

In the pickup shown in Fig. 4 a transducer plate 3 of the twister type has two opposite transverse edges mounted on the housing structure by means of interposed resilient rubber strips 2 and **2*a*. Both elastic supporting strips 2 and 2*a* are located in symmetrical relation to the torsion axis of transducer 3. One of the four corners of transducer 3 is engaged by a cross-shaped connecting piece 4 to which one transverse edge of another transducer 5 is attached. The transducer 5 is a bender. The transducer 3 extends in a horizontal plane so that its area of greatest dimensions is parallel to the surface of the record disc. The transducer 5 extends perpendicular to transducer 3 and hence in vertical relation to the surface plane of the disc. Mounted on other transverse edge of transducer 5 is a linking piece 10, elastic clamping means being preferably interposed. The link 10 extends downwardly. Its lower bifurcated end straddles the pickup arm 11. The rear end of arm 11 is pivotally mounted in a rubber grommet. The front end of arm 11 carries the stylus 13**.

When the pickup is in operation, engaging a sound track on the bottom of the groove and a lateral sound track in the same groove, the vertical deflection of the stylus 13 acts through the link 10, transducer 5 and connecting piece 4 to subject the transducer 3 to torsion. Since this transducer is a twister, it issues a voltage corresponding to the amount of torsional deflection. Due to the illustrated vertical arrangement of the bender-type transducer 5, practically no voltage is then produced in the latter transducer. However, when the stylus deflects laterally, only the bender 5 is subjected to bending deformation and generates voltage, whereas the transducer 3 remains virtually unaffected.

Figure 5:
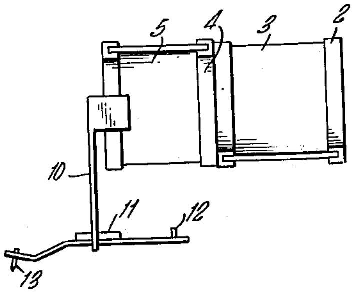
Fig. 5 shows schematically a lateral view of still another embodiment.
Figure 6:
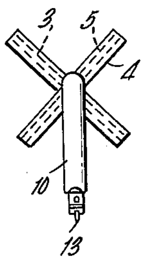
Fig. 6 illustrates the same embodiments seen from the left of Fig. 5.

The pickup illustrated in Figs. 5 and 6 is designed for use with the so-called 45° sound-track records. Such records have the two sound tracks located on the two lateral walls of the groove which are 45° inclined toward the horizontal top surface of the record disc. Accordingly, the two transducers 3 and 5 are so mounted so that their respective planes are 45° inclined toward the horizontal. Consequently, each of the two transducers extends at a substantially right angle to the one side wall of the groove on which the coordinated sound track is located. Both transducers 3 and 5 are of the bender type. The transducer 3 has one transverse edge clamped by means of interposed elastic bearing strips 2 in the housing of the pickup. The opposite edge of transducer 3 is engaged by a groove of a connecting piece 4 which has a second groove in engagement with a transverse edge of transducer 5. The connecting piece 4 has X-shape so that the two grooves extend at an angle of 90° to each other. The other transverse edge of transducer 5 is joined with a link 10, preferably with the aid of interposed elastic material. The lower end of link 10 is coupled with the pickup arm 11 in the manner described above with reference to Fig. 1.

The entire oscillating system, comprising the two interconnected transducers, is thus clamped only at one side so that the other end can oscillate. However, the link 10 may also be coupled with the transducers by means of an interposed pivot mounted in an elastic bearing as in the embodiments of Figs. 1 to 3.

The operation of the pickup according to Figs. 5, 6 is as follows:

When the stylus tip 13 is deflected by the one modulated groove wall relative to which the transducer 3 extends perpendicularly, only the transducer 3 is subjected to bending so that it produces a voltage corresponding to such deflection. When the stylus tip 13 is deflected by the other modulated groove wall, only the transducer 5 is bent so that it produces a voltage corresponding to the latter deflection.

Figure 7:
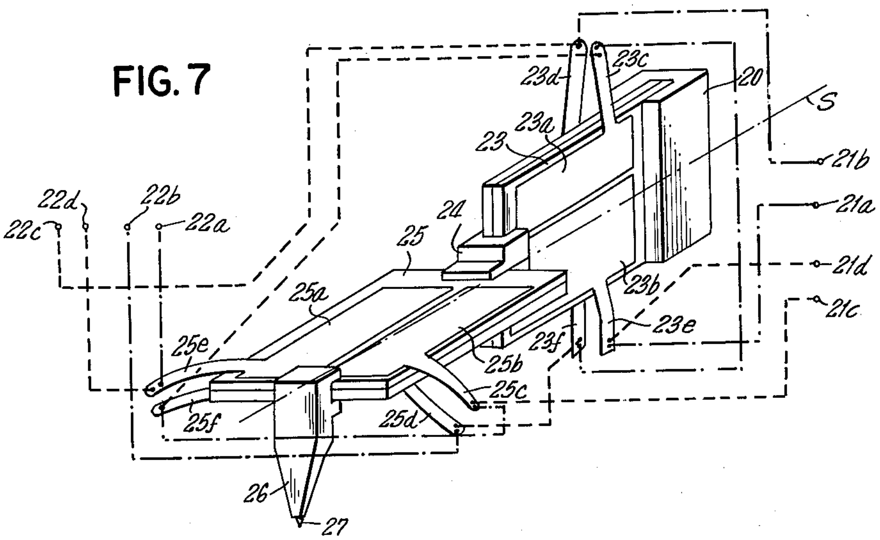
Fig. 7 is a perspective view of still another pickup and a schematic illustration of electric circuit connections applicable therewith.

The two-channel pickup for stereophonic record discs shown in Fig. 7 comprises two plate-shaped transducer elements 23 and 25 of Rochelle salt or barium titanate. Each transducer element is of the twin type and comprises two plates of the same size which are firmly cemented together in face-to-face contact. The transducer plate 23 has one of its transverse end portions clamped to the housing structure (not shown) of the pickup by means of an intermediate elastic clamping member 20 of rubber. The plane of transducer plate 23 is vertical relative to the horizontal surface plane of the record disc. Mounted on the opposite transverse side of transducer 23 is a cross-shaped connecting piece 24 to which one transverse side of the other transducer plate 25 is fastened. Plate 25 extends in a horizontal plane and hence in parallel relation to the surface plane of the record disc. Both plates 23 and 25 have a longitudinal symmetry axis S in common. A stylus member 26 is mounted on the free transverse end of plate 25, preferably elastically, and carries the stylus 27, for instance a diamond or sapphire.

On each of the two broad-area surfaces of each transducer plate there are mounted two electrode foils consisting, for example, of silver. The two electrode foils on the visible side of plate 23 are denoted by 23*a* and 23*b*, it being understood that identical electrodes are mounted on the other broad-area side of the same transducer. The corresponding two electrodes on the visible side of transducer plate 25 are denoted by 25*a* and 25*b*, corresponding to electrodes being mounted on the opposite surface. Each of the two electrodes on each surface covers nearly one-half of that surface and is provided with a terminal flag. The terminal flags of all eight electrodes are visible in Fig. 7 and are denoted by 23*c* to 23*f* and 25*c* to 25*f*. Each two electrodes, located opposite each other on the same transducer element form together a voltage-generating couple.

For the scanning of vertical-horizontal sound tracks, that is stereophonic records with one sound track along the bottom of the groove and the other along a lateral wall of the groove, the voltage-generating couples are to be connected in series as is illustrated in Fig. 7 by dot-and-dash lines. That is, for such use the terminal denoted by 21*a* is connected with flag 23*e*; flag 23*f* is connected with flag 23*c*; and flag 23*d* is connected with terminal 21*b*. The terminals 21*a* and 21*b* thus form part of one of the two output channels. For the same use, the terminals 22*a* and 22*b* of the other channel are connected as follows. Terminal 22*a* is connected with flag 25*e*; flag 25*f* is connected with flag 25*c*; and flag 25*d* is connected with terminal 22*b*.

However the same pickup is also suitable for lateral-lateral sound tracks, i.e. the so-called "45° stereo records" in which the two sound tracks are located along the two inclined side walls respectively of the record groove. For the latter purpose, the electrode 25*a* and the one located beneath it are to be connected in series with the upper pair of electrodes of transducer 23; whereas the electrode 25*d* and the one beneath it are to be connected in series with the lower electrode pair of transducer 23. The just-mentioned connection for 45° stereo records extends as follows: Terminal 21*d* is connected with flag 23*e*; flag 23*f* is connected with flag 25*d*; flag 25*c* is connected with 21*c*. The terminals 21*c* and 21*d* thus furnish the voltage output for one channel. Analogously, the terminal 22*c* of the other channel is connected with flag 23*d*; flag 23*c* is connected with flag 25*f*; and flag 25*e* is connected with terminal 22*d* of the second channel.

Consequently, each two electrode couples of the pickup form a scanning system which responds only to a given directional deflection of the stylus 7 and then furnishes a voltage into one of the two channels for stereophonic reproduction. The purpose of such subdivision of the electrodes in conjunction with the circuit connections described above is to make the voltage of one electrode couple balance and cancel the voltage of the other couple for all movements of the stylus outside of the plane of oscillation coordinated to that particular transducer, whereas these voltages do not cancel each other when the stylus is deflected within the plane of oscillations coordinated to that transducer. By virtue of these features, the cross-talk between the two channels can be kept within extremely slight limits, thus improving the desired channel separation.

Figure 8:
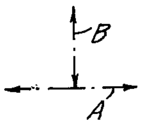
Figs. 8 and 9 are explanatory vector diagrams relating to the pickup of Fig. 7.

Assume that the pickup is to be used for vertical-horizontal sound tracks with a circuit connection as shown by the dot-and-dash lines between terminals 21*a*, 21*b*, and 22*a*, 22*b*. In this case the plane of oscillations A of the stylus tip is horizontal and the other plane of oscillations B is perpendicular to plane A as schematically shown in Fig. 8. As explained, the electrode couples, such as 25a and corresponding electrode on the other side of transducer 25, are connected in series. When subjecting the individual transducer to twisting, its two couples of electrodes generate equal and mutually opposed voltages. Consequently, these two voltages cancel each other. However, when the transducer is subjected to bending the two electrode couples generate equal voltages of the same direction which therefore do not cancel each other in the series connection. Consequently, a deflection in, or parallel to, the plane A produces a voltage only in one transducer, whereas the deflection in, or parallel to, the plane B produces a voltage only in the transducer.

Figure 9:
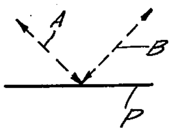

For the scanning of 45° stereo recordings in which, according to Fig. 9, the planes of oscillation A and B are 45° inclined to the horizontal surface P of the record disc, the circuit connections, illustrated by the broken lines in Fig. 7, are such that one of the two channel systems comprises the lower couple of electrodes on transducer 3 and the right-hand couple on transducer 5. The second channel system of the transducer comprises the two other couples of electrodes. The poling of the couples in each channel is opposed to the poling in the other. This has the result that when the stylus tip deflects in plane A upwardly toward the left, the first channel system generates a voltage, whereas the partial voltages generated in the individual electrode couples of the other system cancel each other. When the stylus tip deflects in plane B, the other system generates utilizable voltages whereas the partial voltages in the first system cancel each other.

A pickup according to the invention, as described above with reference to Fig. 7, is thus suitable, simply by varying the circuit connections, for vertical-horizontal stereo recordings as well as for 45° stereo recordings. Each pickup is preferably wired for only one of the two above-described ways of application; but if desired, both connecting circuits may be provided together with a selector switch (not shown) which makes one and the same pickup selectively applicable for both types of grooved stereo recordings.

Figure 10:
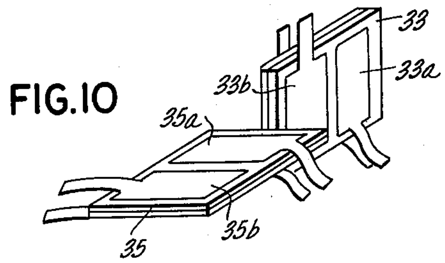
Fig. 10 shows schematically in perspective a modification of a pickup generally similar to that of Fig. 7.

Fig. 10 shows the two transducer elements of a somewhat modified pickup otherwise similar to the one described above with reference to Fig. 7. According to Fig. 10 the two electrodes on each broad-area surface of a transducer element extend transversely. That is, the element 33 has on each surface an electrode 33a extending on the rear half, and another electrode 33b on the forward half of that surface. The second element 35 is provided with corresponding electrodes 35a and 35b. The applicable circuit connections and the operation of the pickup are substantially the same as described above with reference to Fig. 7.

It will be obvious to those skilled in the art, upon studying this disclosure, that my invention permits of various modifications other than those illustrated and described herein. For example, instead of making the transducers self-supporting they may also be mounted on or joined with carrying or bracing structures. Such other modifications being applicable without departing from the essential features of my invention and within the scope of the claims annexed hereto.

I claim:

1. Stylus device for grooved sound records with stereophonic sound tracks whose respective undulatory amplitudes have directions substantially perpendicular to each other, comprising a supporting structure, a single stylus member for simultaneous engagement with both sound tracks mounted on said structure and having a stylus tip deflectable in said two directions relative to said structure, a transducer assembly of elongated shape having one end attached to said structure and having the other end mechanically connected with said stylus, said assembly comprising two piezoelectric transducer elements to provide for two electric channels correlated to said respective sound tracks, said transducer elements being located one behind the other along the longitudinal axis of said assembly between said two ends and having different respective main orientations of response corresponding to said two directions respectively.

2. Stylus device for grooved sound records with stereophonic sound tracks whose respective undulatory amplitudes have directions substantially perpendicular to each other, comprising a supporting structure, a single stylus member for simultaneous engagement with both sound tracks mounted on said structure and having a stylus tip deflectable in said two directions relative to said structure, an elongated transducer structure having two piezoelectric plate elements each having one axial end mechanically joined with the other plate, the other end of one of said elements being mechanically connected with said stylus member, said two transducer elements being correlated to said two sound tracks and having different respective main orientations of response corresponding to said two directions respectively.

3. In a device according to claim 2, one of said piezoelectric transducer elements being of the twister type for torsional actuation, and said other element being of the bender type.

4. In a device according to claim 3, said two plate elements extending in the same plane.

5. In a device according to claim 2, said two plate elements having respective planes extending at a right angle to each other.

6. In a device according to claim 2, said two plate elements being both of the bender type and having respective planes extending at a right angle to each other.

7. A device according to claim 1 comprising mechanical damping means engageable with said two transducer elements and having different degrees of damping relative to said respective elements.

8. A phonograph pickup for grooved sound records with stereophonic sound tracks whose respective undulatory amplitudes have directions substanttially perpendicular to each other, comprising a housing, two piezoelectric transducer elements of flat shape aligned in said housing, elastic mounting means joining one end of one of said elements with said housing, a substantially rigid connecting member joining the end of said one element with one end of said other element, a pivot member joined with the other end of said other element, an elastic bearing mounting said pivot member on said housing whereby said pivot member is capable of deflection in all directions of a plane transverse to the alignment direction of said transducer elements, said two transducer elements having respective maximum sensitivities in two of said directions of deflection substantially perpendicular to each other, a stylus member universally pivoted to said housing and coupled with said pivot member.

9. A phonograph pickup for grooved sound records with stereophonic sound tracks whose respective undulatory amplitudes have directions substantially perpendicular to each other, comprising a housing, two piezoelctric transducer elements in said housing each having the shape of a flat plate, one of said transducer elements being a bender and the other a twister, elastic mounting means joining one end of said bender element with said housing, a substantially rigid connecting member joining the other end of said bender element with one end of said twister element, a pivot member joined with the other end of said twister element and having a pivot pin substantially coaxial with the twister axis, an elastic bushing journalling said pivot pin to said housing whereby said pivot member is capable of rotary and deflective movements relative to said housing, a stylus member having an arm articulately linked to said housing and having a stylus tip for simultaneous engagement of both sound tracks, and a link coupling said arm with said pivot member.

10. In a phonograph pickup according to claim 9, said two plate-shaped transducer elements extending normally in a common plane substantially parallel to the surface plane of the record.

11. In a phonograph pickup according to claim 9, the plane of said twister element being substantially vertical and the plane of said bender element being substantially horizontal when the pickup is in normal operative position, and said connecting member having cross-wise extending parts engaging said two elements respectively.

12. A phonograph pickup for grooved sound records with stereophonic sound tracks whose respective undulatory amplitudes have directions substantially perpendicular to each other, comprising a housing, two piezoelectric transducer elements of flat shape aligned in said housing, elastic mounting means joining one end of one of said elements with said housing, a substantially rigid connecting member joining the end of said one element with one end of said other element, a pivot member joined with the other end of said other element, an elastic bearing member mounting said pivot member on said housing whereby said pivot member is capable of deflection in all directions of a plane transverse to the alignment direction of said transducer elements, said two transducer elements being responsive to bending and having their respective planes extend at a substantially right angle to each other, said connecting member having cross-wise extending parts in engagement with said respective elements, and a stylus member having an arm universally pivoted to said housing and coupled with said pivot member.

13. In a phonograph pickup according to claim 12, said two transducer elements and said pivot member having a common axis, and each of said respective planes of said transducer elements being inclined about 45° toward the horizontal when the pickup is in operative position.

14. In a stylus device according to claim 1, said two transducer elements being plate shaped, one of said elements having two opposite transverse sides joined with said housing so as to be capable of torsional distortion, said other transducer element having one transverse side joined with one side of said one element at an off-center location relative to the torsion axis of said one element, the plane of said other element extending substantially parallel to said torsion axis and at a substantially right angle to the plane of said one element, said stylus member being universally pivoted to said housing, and coupling means connecting said stylus member with the other transverse side of said other transducer element.

15. In a device according to claim 1, each of said two transducer elements having the shape of a plate and having two mutually spaced surface electrodes mounted on each of its two plate faces on different sides respectively of a given center axis of said plate face, and each two electrodes located opposite each other on said respective two plate faces being electrically connected in series with two other electrodes also located opposite each other on one of said two transducer elements.

16. Stylus device for grooved sound records with stereophonic sound tracks whose respective undulatory amplitudes have directions substantially perpendicular to each other, comprising a supporting structure, a single stylus member for simultaneous engagement with both sound tracks mounted on said structure and having a stylus tip deflectable in said two directions relative to said structure, transducer means mechanically connected with said stylus for mechanical actuation of one by the other, said transducer means comprising two plate-shaped piezoelectric transducer elements having parallel longitudinal axes respectively and extending in respective planes inclined at a substantially right angle to each other, each element having two mutually spaced surface electrodes of metal on each of the two opposite plate faces and on respectively different sides of a given symmetry axis of said face, and each two electrodes located opposite each other on said respective two plate faces being electrically connected in series with two other electrodes also located opposite each other on one of said two transducer element.

17. In a device according to claim 16, said two opposite electrodes of each transducer element being electrically connected in series with two opposite electrodes of the other transducer element.

18. In a device according to claim 16, said two electrodes on each plate face being located on different sides of the longitudinal center axis of said face.

19. In a device according to claim 16, said two electrodes on each plate face being located on different sides of the transversal center axis of said face.

20. A stylus device to be used with grooved sound records having stereophonic sound tracks whose undulatory amplitudes are orthogonal with respect to each other for producing one discreet electrical output for each of the undulatory amplitudes, comprising a supporting structure, a single stylus member for simultaneous engagement with both sound tracks mounted on said structure and having a stylus tip deflectable in said two directions, a pair of piezoelectric plate elements positioned within said supporting structure and connected with one another, the first of said piezoelectric plate elements being connected mechanically with said stylus member and positioned so as to respond to motion of the stylus member in the direction of one of the undulatory amplitudes of the sound track, and so as to be oscillated along its own plane by the oscillations of the stylus member in the direction of the other of the undulatory amplitudes of the sound track, the second of said piezoelectric plate elements being mechanically secured to said mounting structure at one edge and connected along the center of another edge to the first of said piezoelectric plate elements so as to respond to the oscillations of said first element along its plane.

21. A stylus device to be used with grooved sound records having stereophonic sound tracks whose undulatory amplitudes are orthogonal with respect to each other for producing one discreet electrical output for each of the undulatory amplitudes, comprising a supporting structure, a single stylus member for simultaneous engagement with both sound tracks mounted on said structure and having a stylus tip deflectable in said two directions, a pair of piezoelectric plate elements positioned within said supporting structure and connected with one another, said plates being arranged one behind the other along a common longitudinal axis which passes parallel to the plane of each of said plates so as to symmetrically divide said plates, the first of said piezoelectric plate elements being connected mechanically with said stylus member and positioned so as to respond to motion of the stylus member in the direction of one of the undulatory amplitudes of the sound track, and so as to be oscillated along its own plane by the oscillations of the stylus member in the direction of the other of the undulatory amplitudes of the sound track, the second of said piezoelectric plate elements being mechanically secured to said mounting structure at one edge and connected along the center of another edge to the first of said piezoelectric plate elements so as to respond to the oscillations of said first element along its plane.

References Cited in the file of this patent

UNITED STATES PATENTS

| | | |
|---|---|---|
| 1,760,198 | Hough | May 27, 1930 |
| 1,902,184 | Rieber | Mar. 21, 1933 |
| 2,114,471 | Keller et al. | Apr. 19, 1938 |
| 2,328,478 | Mason | Aug. 31, 1943 |
| 2,542,017 | Esty et al. | Feb. 20, 1951 |